United States Patent
Seto et al.

[15] 3,704,625
[45] Dec. 5, 1972

[54] THERMOMETER USING LIQUID CRYSTAL COMPOSITIONS

[72] Inventors: Hiroshi Seto; Mituko Ueda, both of Tokyo; Humio Segawa, Saitama-ken, all of Japan

[73] Assignee: Sankyo Keiryoki Kabishiki Kaisha, Tokyo, Japan

[22] Filed: Dec. 28, 1970

[21] Appl. No.: 101,532

[52] U.S. Cl. .................................................73/356
[51] Int. Cl. ..............................................G01k 11/16
[58] Field of Search ......73/356; 23/230 LC; 252/408

[56] References Cited

UNITED STATES PATENTS

| | | | |
|---|---|---|---|
| 3,441,513 | 4/1969 | Woodmansee | 23/230 LC |
| 2,932,971 | 4/1960 | Moore | 73/356 |
| 3,597,976 | 8/1971 | Fryar | 73/358 |

OTHER PUBLICATIONS

Physics by Hausman and Slack copyright 1935 and 1939 page 622.

Primary Examiner—Louis R. Prince
Assistant Examiner—Denis E. Corr
Attorney—George B. Oujevolk

[57] ABSTRACT

A thermometer comprising a plurality of temperature responsive sections formed of liquid crystal compositions and which change their color in response to a specific range of prime temperature. Each temperature responsive section in its responsive state produces a different color depending upon temperature within the specific range. The color thus produced can be numerically identified by reading a comparable chromatic pattern.

1 Claim, 2 Drawing Figures

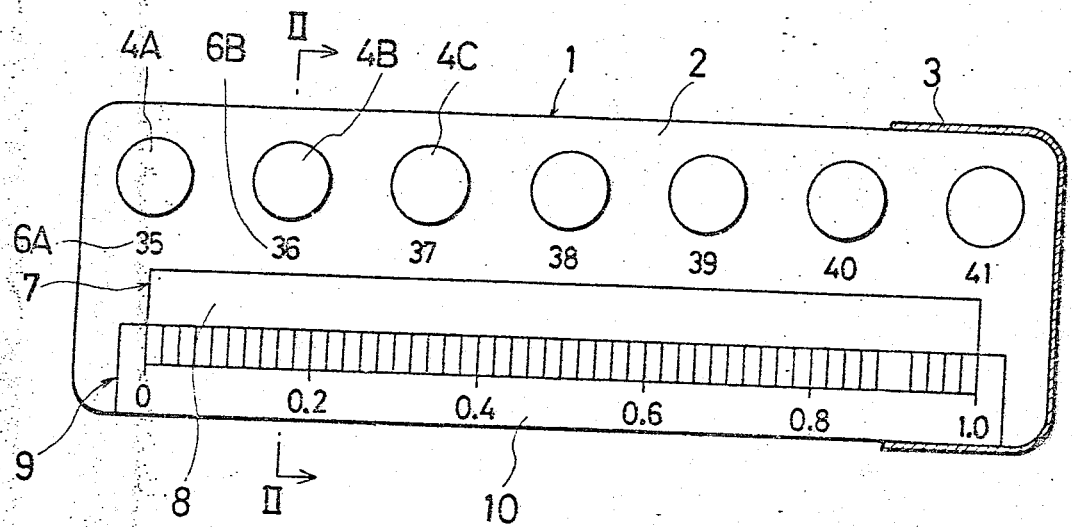
FIG_1
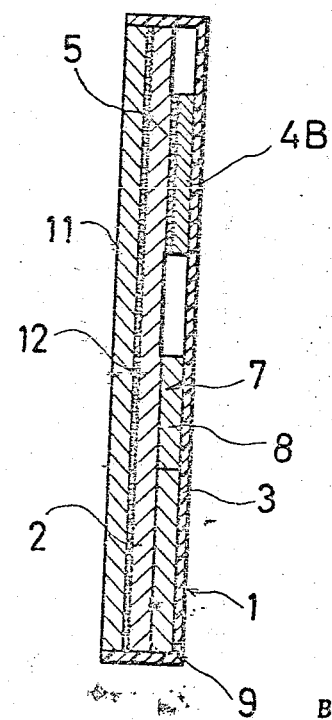
FIG_2

THERMOMETER USING LIQUID CRYSTAL COMPOSITIONS

BACKGROUND OF THE INVENTION

This invention related to a thermometer using temperature responsive liquid crystal compositions whose initial color changes responsive to threshold temperatures.

SUMMARY OF THE INVENTION

The principal object of this invention is the provision of a thermometer of the type described above, which is not only fast-acting, safe to handle, and light in weight, but also readable relatively to a finely graduated degree.

BRIEF DESCRIPTION OF THE DRAWING

FIG. 1 is a plan view of a temperature measuring device embodying this invention with its front cover removed, and FIG. 2 is an enlarged cross section taken along a line II—II of FIG. 1.

DESCRIPTION OF THE PREFERRED EMBODIMENT

Referring to FIGS. 1 and 2, the reference numeral 1 indicates a support comprising a base sheet 2 formed of metal, such as aluminum, or synthetic resin, and a front cover 3 formed of a substantially transparent synthetic resinous material and having dimensions substantially equal to those of the base sheet 2. Between the base sheet 2 and the front cover 3 are arranged a plurality of temperature responsive sections 4A, 4B, 4C ... formed of liquid crystal compositions. Seven such sections are illustrated in FIG. 1 in alignment with each other with spacings, and accompanied by numerical indications 6A, 6B ... indicating threshold temperatures at which the temperature responsive sections 4A, 4B, 4C ... react.

The temperature responsive sections may be formed by suitably depositing or spraying on the bottom surface of the front cover 3 or on the upper surface of the base sheet 2 seven different liquid crystal compositions each having a color changing property at predetermined temperatures. Namely, the temperature responsive section 4A is responsible to a specific range of temperature or a temperature between 35° and 36° C, the section 4B between 36° and 37° C, the section 4C between 37° and 38° C and so forth, so that the thermometer as illustrated may be used to measure a temperature between 35° C and 42° C.

For the purpose of description, such a specific range of temperature will herein be referred to as " a prime temperature range " or the like. The temperature responsive sections in their non-responsive state are substantially transparent or clear. For better visual observation, it is preferred that a black or dark backing 5 is deposited to directly underlie the temperature responsive sections, so that the sections will appear black in the non-responsive state.

Because of the nature of liquid crystal compositions used, such as cholesteric liquid crystal compositions, as taught in U.S. Pat. No. 3,441,513 each temperature responsive section will produce various colors depending upon temperature within the prime temperature range. For example, when the section 4A whose prime temperature range is between 35° to 36° C is heated first at 35° C and the temperature is gradually elevated to 36° C, it will first be colored red and the color will then change successively from red to orange, yellow, green, light blue, dark blue and purple in the order mentioned.

The thermometer of this invention further comprises a first strip 8 carrying a chromatic pattern 7 thereon and a second strip 10 which bears a graduation 9 with numerical indications. The first and second strip 8 and 10 may be bonded to the surface of the base sheet. Alternatively the chromatic pattern 7 and the graduation 9 may be reproduced directly on the base sheet or either side of the front cover 3, for example, by printing.

The chromatic pattern 7 represents a rainbow, like pattern including red, orange, yellow, green, sky blue, dark blue and purple. These colors correspond to the colors that can be produced by any temperature responsive section when the temperature to which said section is subjected falls in its prime temperature range. The entire length of the chromatic pattern 7 which covers 1° Centigrade is graduated as at 9 so as to indicate, for example, a fiftieth of a degree. In the embodiment shown, the graduation 9 is numbered in step of 0.2° C, which will practically assist reading of substantially a tenth of a degree Centigrade.

In operation, when the device is exposed to an object whose temperature is to be measured and the temperature responsive section, say 4C, produces a color other than black or different from the other sections, it can be read that the temperature is 37° C or above, but less than 38° C. The specific color produced should then be identified on the chromatic pattern. If the color is orange and the visually equivalent color in the chromatic pattern is read to be indicated by 0.2 of the graduation, the measuring temperature should be 37.2° C. When the temperature is say exactly 37° C, two adjacent sections, such as sections 4B and 4C will operate to be responsive. In such a case, either one of them may be optionally selected as an operating section, and the color thereof compared with the chromatic pattern.

On the rear surface of the base sheet 2 may be deposited an adhesive film 12 which in turn may be covered with a thin protection sheet 11 made of a material capable of being easily peeled. The adhesive film 12 permits the device to be so positioned as to be properly exposed to an object or a patient whose temperature is to be measured.

If a reversible-type liquid crystal composition is employed instead of a memory type composition, repeatedly usable thermometers may be provided.

What is claimed is:

1. A thermometer for measuring body temperature, comprising:
   a. a support (1) with front and back including an elongated base sheet (2) and a transparent cover (3) over said base sheet on the front;
   b. a first strip (8) on said base sheet (2), said base sheet having thereon a plurality of temperature responsive sections (4A, 4B, 4C) of cholesteryl crystals, said sections being aligned with spacing therebetween and accompanied by numerical designations (6A) indicating the threshold temperature at which a particular section reacts;

c. a fine scale (9) on a second strip (10) incremented in fractions of the temperature difference between the response temperatures of adjacent sections disposed along one side of said support, said first and second strips (8, 10) being between said base sheet (2) and said cover (3); and, d. adhesive means on the back side of said support.

* * * * *